UNITED STATES PATENT OFFICE.

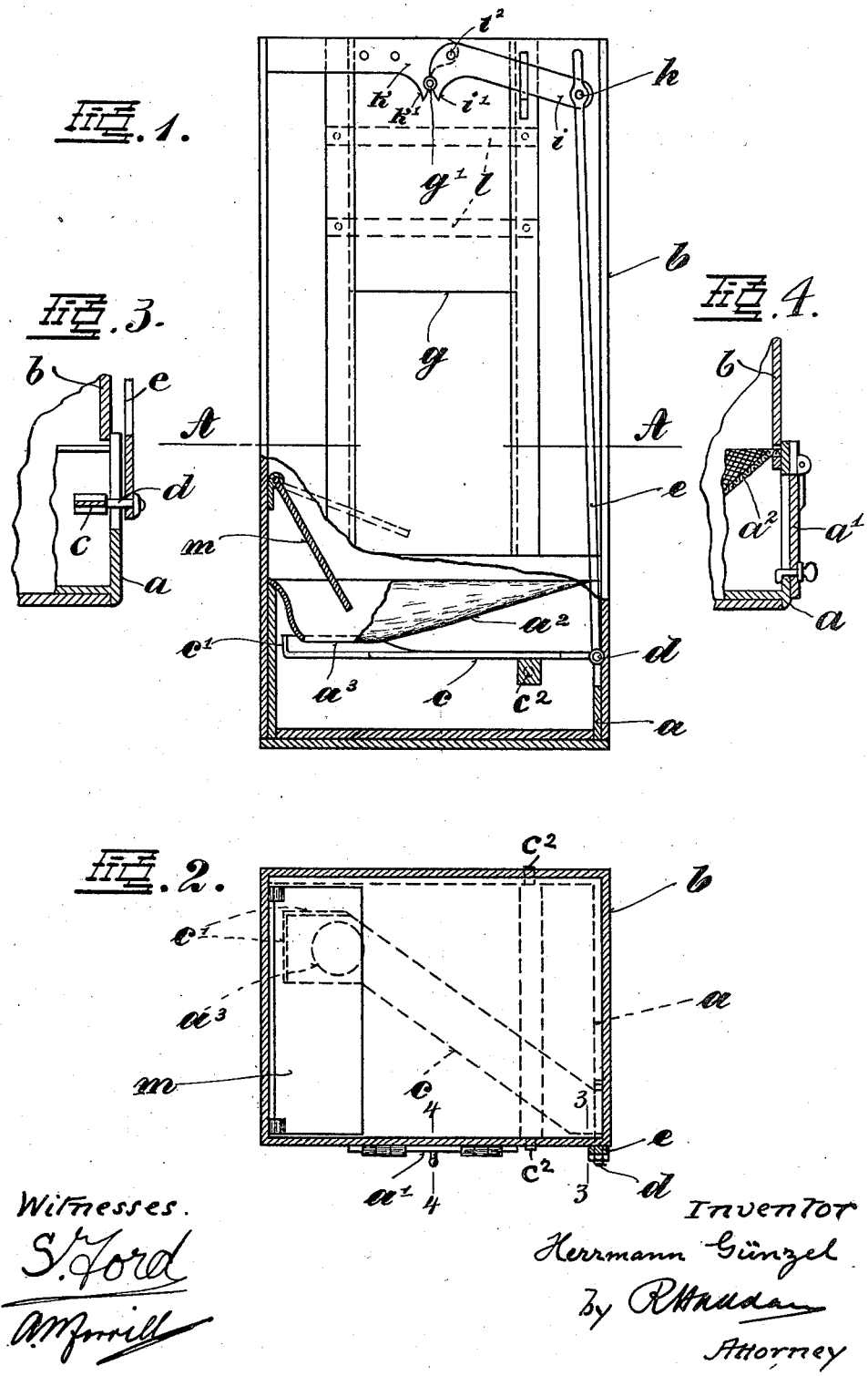

HERRMANN GÜNZEL, OF LODZ, PRUSSIA, GERMANY.

TRAP-NEST.

1,029,924.

Specification of Letters Patent. Patented June 18, 1912.

Application filed May 18, 1910. Serial No. 562,108.

*To all whom it may concern:*

Be it known that I, HERRMANN GÜNZEL, a subject of the King of Prussia, residing at Lodz, in Prussia, Germany, have invented a certain new and useful Improvement in Trap-Nests, of which the following is a specification.

This invention relates to trap-nests for breeding purposes, and its object is to provide improved means whereby egg-laying hens can be identified without unnecessarily protracted isolation.

To this end the invention substantially consists in providing a cage or housing with a normally open door connected to a closing device adapted to be actuated by the depositing of an egg in the cage, so that the hen which lays the egg is trapped by the closing of the door.

A construction embodying this improvement is shown in the accompanying drawings, in which—

Figure 1 is a front elevation of the cage, partly in section, and Fig. 2 a horizontal section on the line A—A of Fig. 1. Figs. 3 and 4 are vertical sectional views through the front of the apparatus taken respectively on lines 3—3 and 4—4 Fig. 2.

In the drawing, $a$ represents a drawer, which has a door $a^1$ and is slidable in the lower part of the cage or housing $b$; $a^2$ is a nest which rests upon the drawer. The floor of this nest slopes toward an aperture $a^3$, below which is located the dished end $c^1$ of the longer arm of a double-armed lever $c$ pivoted at $c^2$ in the cage, so that the dish $c^1$ forms a movable part of the nest-floor. The shorter arm of the lever $c$ is pivoted at $d$ to a rod $e$ which extends to the upper part of the cage, where it is pivoted at $h$ to a double-armed lever $i$ pivoted at $i^2$. The latter has a notch $i^1$ which normally coacts with a notch $k^1$ in a fixed abutment $k$ to engage a stud $g^1$ fixed to a vertically slidable door $g$, the latter being held in its raised position by the engagement, so that hens have free access to the cage. Two bars $l$ are fixed across that part of the door-aperture which is closed when the door is in its raised position. An inclined plate $m$ is hingedly fixed to one wall of the cage and extends over the aperture $a^3$, so that a bird occupying the nest cannot step through the aperture, but there is sufficient space below the edge of the board to enable an egg to roll from the inclined floor of the nest through the aperture. When an egg is laid in the nest it rolls down the sloping floor, through the aperture $a^3$, on to the dished end of the lever $c$, and rocks the latter so that the rod $e$ is thrust upward and rocks the lever $i$. By this means the notch $i^1$ is caused to release the stud $g^1$, and the door $g$ falls and traps the hen in the cage. The door —$a^1$— normally closes an opening in the front of the drawer through which the hand may be extended to remove the egg from the dish or tray —$c^1$— which has been tilted down by the weight of the egg some distance below the nest. If necessary, the drawer —$a$— together with the nest —$a^2$— and tilting arm —$c$— may be withdrawn from the housing by simply reaching in through the opening directly under the door —$g$— and rocking the plate —$m$— upward above the plane of the drawer to the position indicated by dotted lines and then by removing the nut on the outer end of the pivot —$d$— the link —$e$— may be withdrawn from said pivot and shifted to one side to afford free passage for the withdrawal of the drawer.

What I claim as my invention and desire to secure by Letters Patent of the United States is:—

1. A trap-nest comprising a housing having an opening in one side, a self-closing door for the opening, a stud on the door, a detent for engaging said stud and holding the door in its open position, a nest within the housing and having an inclined bottom and an opening therethrough at the lowest point, a plate extending across and above the nest opening and spaced apart from the bottom of said nest, a movable receptacle underlying the nest opening and adapted to be operated by the weight of an egg which may be deposited in the nest and connections between said receptacle and detent for tripping the detent and allowing the door to close when the receptacle is operated.

2. A trap-nest comprising a housing having an opening for the passage of a fowl, a door for the opening, means for holding the door in its open position, a drawer in the bottom of the housing, a nest supported on said drawer and provided with an inclined bottom having an opening therein for the passage of an egg therethrough, a plate extending across and above the nest opening and spaced apart from the bottom thereof, a movable receptacle underlying the nest opening and adapted to be operated by the weight of an egg which may be deposited thereon and means brought into action by the movement of said receptacle for operating the door holding means to release the door and allow the latter to close by its own gravity.

3. A trap-nest comprising a housing having an opening in one side thereof for the passage of the fowl, a self-closing door for said opening, a stud on the door, a pivoted detent for engaging the stud and holding the door in its open position, a nest within the housing having an inclined bottom provided with an opening therethrough at its lowest point, a rocker arm having a receptacle underlying the nest opening and adapted to be operated by the weight of an egg therein, and a link connecting the rocker-arm to the detent for tripping the latter and releasing the door when the receptacle is depressed.

In witness whereof I have signed this specification in the presence of two witnesses.

HERRMANN GÜNZEL.

Witnesses:
 THOMAS MILES,
 AUDREY KEKERIEY.

Copies of this patent may be obtained for five cents each, by addressing the "Commissioner of Patents, Washington, D. C."